United States Patent [19]

Russak

[11] Patent Number: 4,700,925

[45] Date of Patent: Oct. 20, 1987

[54] PRESSURE MEDIUM OPERATED SERVOMOTOR ARRANGEMENT

[75] Inventor: Steffen P. Russak, Winterthur, Switzerland

[73] Assignee: Sulzer Brothers Limited, Winterthur, Switzerland

[21] Appl. No.: 560,238

[22] Filed: Dec. 12, 1983

[30] Foreign Application Priority Data

Dec. 15, 1982 [CH] Switzerland ........................ 7288/82

[51] Int. Cl.[4] ...................... F16K 31/124; F16K 35/00

[52] U.S. Cl. ........................................ 251/73; 251/94; 91/44; 91/45; 92/24; 92/26; 92/27

[58] Field of Search ...................... 91/44, 45; 74/527; 251/26, 30.1, 73, 297, 94, 61; 137/463, 624.27; 92/27, 28, 26, 24, 30

[56] References Cited

U.S. PATENT DOCUMENTS

| | | | |
|---|---|---|---|
| 862,867 | 8/1907 | Eggleston | 251/61 X |
| 2,081,542 | 5/1937 | Kidney | 137/463 |
| 2,394,785 | 2/1946 | Kindervater | 92/28 |
| 2,412,105 | 12/1946 | Sutton | 251/94 |
| 2,908,251 | 10/1959 | Gratzmuller | 91/45 |
| 3,064,464 | 11/1962 | Black et al. | 91/44 |
| 3,068,650 | 12/1962 | Phillips | 91/44 |
| 3,115,330 | 12/1963 | Dollison | 137/624.27 X |
| 3,183,791 | 5/1965 | Cruse | 92/28 |
| 3,359,862 | 12/1967 | Modrich | 91/45 |
| 3,397,620 | 8/1968 | Skelton et al. | 92/28 X |
| 3,512,549 | 5/1970 | Wiegand | 251/73 |
| 3,646,968 | 3/1972 | Binkley et al. | 251/73 |
| 3,869,107 | 3/1975 | Field, Jr. et al. | 251/94 |
| 4,103,864 | 8/1978 | Hagendorn | 251/94 |
| 4,373,698 | 2/1983 | Anisimov et al. | 251/26 |

FOREIGN PATENT DOCUMENTS

| | | | |
|---|---|---|---|
| 384715 | 6/1922 | Fed. Rep. of Germany | 91/44 |
| 1058802 | 6/1959 | Fed. Rep. of Germany | 251/94 |
| 48981 | 8/1917 | Sweden | 91/44 |

*Primary Examiner*—Alan Cohan
*Assistant Examiner*—John A. Rivell
*Attorney, Agent, or Firm*—Kenyon & Kenyon

[57] ABSTRACT

The servomotor arrangement has a moving system comprising a piston movable in a cylinder. A latching or retaining member movable transversely of the direction of movement of the system is provided to retain or latch the moving system. The latching member is in operative connection with a pressure chamber, and the pressure chamber is in communication by way of a stop member with a pressure medium source and with a pressure medium sink. The latching member is controllable, a feature which has advantages for the operating behavior of the servomotor arrangement.

10 Claims, 7 Drawing Figures

PRESSURE MEDIUM OPERATED SERVOMOTOR ARRANGEMENT

This invention realtes to a pressure medium operated servomotor arrangement.

As is known, various types of pressure-medium-operated servomotor arrangements have been known for use with valves, such as described in U.S. Pat. No. 4,513,943, wherein valving is arranged to control the position of a servomotor piston in dependence on a pressure difference across the piston. Similar arrangements are also known in which a latching member is utilized to retain the valve in a normal position. Generally, in these arrangements a compression spring has been used to apply a permanent biasing force to the latching member. Thus, the valve can be retained in an operative position without any need to maintain a pressure difference across the servomotor piston. This obviates a continuous discharge of medium along a rubbing or sliding surface of the piston. However, one disadvantage of this arrangement is that the moving system has to be loaded axially, for instance, by the application of a pressure difference across the servomotor piston in order for the system to be released, for example, at changeover from a normal position into a safety position. This kind of operation is unsatisfactory for more stringent safety requirements since the servomotor arrangement must be able to move into the safety position when, for instance, no pressure medium is available to operate the servomotor or where the pressure medium is pressureless.

Accordingly, it is an object of the invention to provide a servomotor arrangement which can be operated without any supply of external energy to move from a normal position into a safety position with a reduced outlay of structure and circuitry.

It is another object of the invention to provide a servomotor arrangement of compact construction wherein a latching member is movable transversely of the direction of movement of a piston of the servomotor.

It is another object of the invention to provide a servomotor arrangement wherein a latching member for a piston of the servomotor does not inhibit movement of the piston from a normal position into a safety position.

Briefly, the invention provides a pressure medium operated servomotor arrangement which includes a moving system having a cylinder and a piston movably mounted in the cylinder, a pressure chamber and at least one latching member disposed across the pressure chamber for movement transversely of the direction of movement of the piston between a latching position to latch the piston and a release position to unlatch the piston. In addition, the arrangement has a first means for connecting the pressure chamber to at least one pressure medium source, a second means for connecting the pressure chamber to at least one pressure medium sink and a stop member in at least one of these means to selectively block communication between the given means and the pressure chamber.

The construction of the servomotor arrangement is such that the movement of the latching member can be readily controlled. Further, the latching member which is in communication with the pressure chamber has at least one end face bounding the pressure chamber. In this regard, the term "end face" is to be understood as meaning an exposed surface having two dimensions in a direction transverse to the direction of movement of the latching member.

The construction of the servomotor arrangement is such that the latching member no longer inhibits movement of the moving system from a normal position into a safety position. For example, in the case where the pressure chamber is in communication with a pressure medium source so that the latching member may latch the moving system, the pressure on the end face of the latching member experiences a decrease either because the pressure chamber communicates with the pressure medium sink or in the event of loss, of pressure medium or even destruction of the pressure medium system in order to release the latching member from the latching position. In the case in which the pressure chamber is in communication with the pressure medium sink so that the latching member does not latch the moving system, the pressure in the pressure chamber experiences increase when the chamber is connected to the pressure medium source in order to bring the latching member in the latching position.

Control of the latching member by means of the stop member is very simple and can be combined in any required manner, for example, by a parallel connection with the remainder of the control of the servomotor arrangement.

Since the latching member can be of an inexpensive and reliable construction, a number of latching members can be used simultaneously. This feature further increases the reliability of the servomotor arrangement.

Further, because the latching member is controllable, the latching member can be relieved of load while the moving system is changing over from one position to another. This feature reduces both the energy consumption and the wear of the arrangement as compared with previously known arrangements of a latching member.

The servomotor arrangement can be utilized in various embodiments which provide convenient adaptation to the requirements of the servomotor arrangement.

The latching member can be constructed and disposed so that even when the end face experiences the maximum pressure of the pressure source, the moving system overcomes the retaining or latching force of the latching member when a predetermined critical axial load acting on the moving system is exceeded. This insures that the latching member cannot hamper any necessary movements of the moving system into a safety position.

In one embodiment, the latching member is in the form of a diaphragm and cooperates with a braking member having a braking surface which faces the diaphragm in the latching position of the diaphragm. In addition, the servomotor arrangement has a stationary part mounting one or the other of the diaphragm and braking member while the piston has the other of the diaphragm and braking member thereon. This provides a very simple embodiment of the latching member which obviates the need for the latching member to rub on a surface.

In another embodiment, the latching member may be in the form of a plunger. In this embodiment, the moving system can be latched with a reduced axial loading of the latching member. Thus, most of the latching force can be absorbed by a guide of the plunger.

In another embodiment, wherein the latching member is in the form of a plunger, the servomotor arrangement has a casing for housing the moving system as well as a corrugated tube which connects one end of the plunger to the casing to define the pressure chamber. In this embodiment, the corrugated tube obviates leakage along the plunger.

Where the latching member is in the form of a plunger, the latching member can be sealingly seated in a casing in at least one of the latching position and release position. This provides a relatively inexpensive way of avoiding leakage along the plunger in the end position.

The servomotor arrangement may also have a valve casing secured to the cylinder. In this case, a rod is secured to the piston and extends into the valve casing while a valve lid is secured to the rod within the valve casing. This provides a very advantageous use of the servomotor arrangement which permits compliance with the most stringent safety requirements.

In this latter embodiment, the means for connecting the pressure chamber to a pressure medium source connects the pressure chamber to an inflow side of the valve casing. This eliminates the need for any special pressure medium source. Further, the need for an external pressure medium supply line is eliminated; a consideration which provides technical advantages so far as safety is concerned.

The servomotor arrangement may also be provided with at least one check valve in the means for communicating the pressure chamber with a pressure medium source in order to prevent a pressure drop in the pressure chamber when the stop member is in a position corresponding to the latching member being in the latching position. This increases the reliability of the control of the latching member since the presence of the check valve insures that, not withstanding a complete failure of the pressure medium source, the action of the latching member continues at least for a time.

In still another embodiment, the servomotor arrangement may be constructed with a moving system and pressure chamber as above as well as at least one intermediate element which is mounted for transverse movement relative to the piston between a latching position to latch the piston and a release position to unlatch the piston. In this embodiment, a plunger communicates with the pressure chamber for moving axially of the piston between a first position holding the intermediate element in the latching position and a second position permitting the intermediate element to move from the latching position into the release position. Suitable means are also provided for communicating the pressure chamber with at least one pressure medium source and at least one pressure medium sink. Also, a stop member is provided as above, to selectively block communication between the pressure chamber and one of the pressure medium source or pressure medium sink.

In this embodiment, the intermediate element is mounted to move along a bearing surface of the servomotor arrangement. The provision of the intermediate element increases the retaining force of the latching member since the bearing surface insures that the axial force of the moving system acts on the plunger only in an attenuated form.

The servomotor arrangement can be of very simple construction if the intermediate element is formed as a rolling member to roll along the bearing surface between the latching position and the release position while the bearing surface is disposed at an angle relative to the direction of movement of the piston.

These and other objects and advantages of the invention will become more apparent from the following detailed description taken in conjunction with the accompanying drawings wherein.

Figure 1:
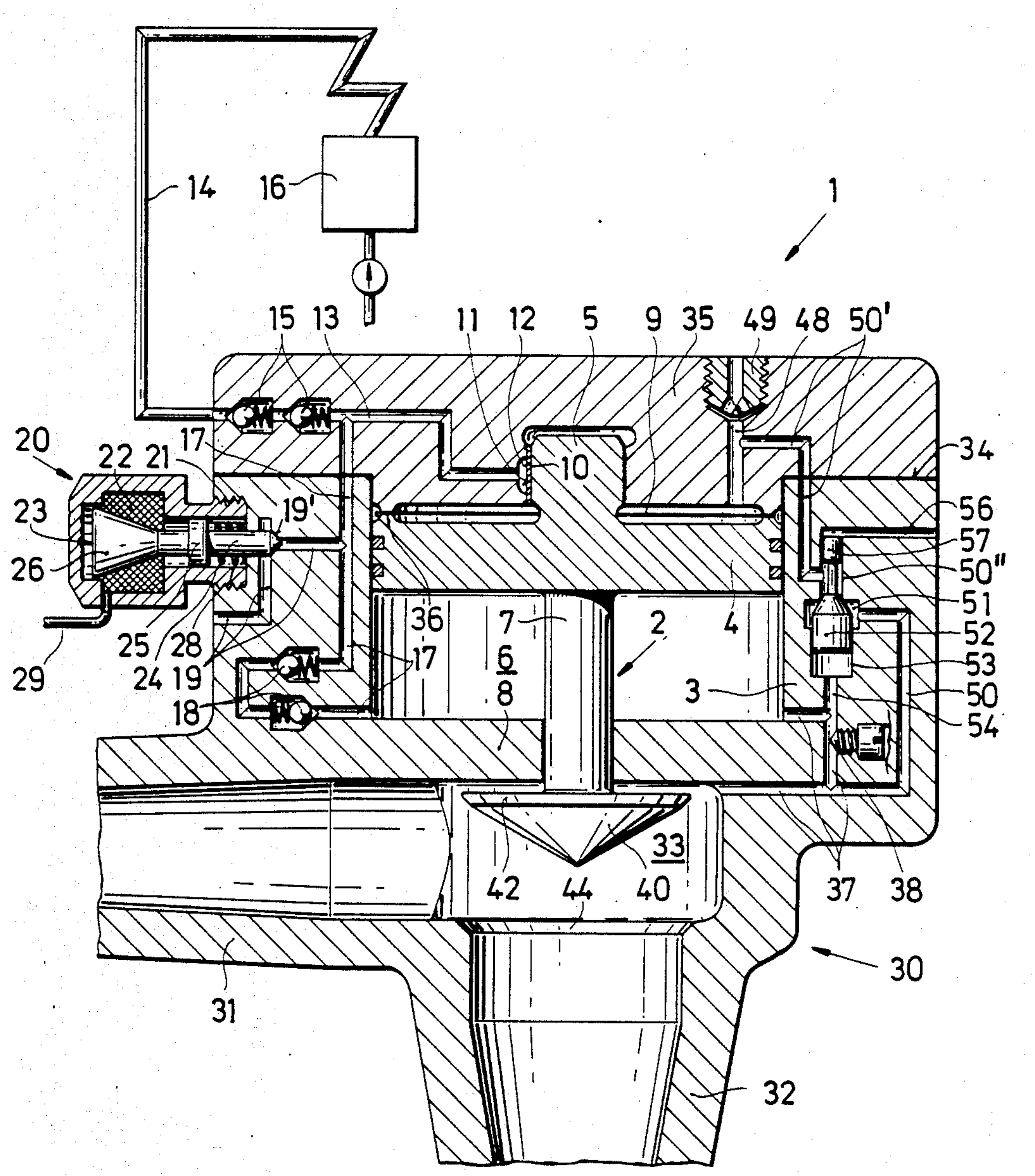
FIG. 1 illustrates a diagrammatic cross sectional view of a servomotor arrangement and valve in accordance with the invention.

Referring to FIG. 1, the servomotor arrangement 1 includes a moving system 2 which comprises a cylinder 3 in which a piston 4 is movably mounted. As viewed, the piston 4 has a cylindrical extension 5 at the top end which cooperates with a latching member 10 received in a head 35 of the cylinder 3. In addition, the cylinder head 35 is secured in gas-tight manner by screws (not shown) to a top end face 34 of the cylinder 3. The head 35 includes a pressure chamber 12 across which the latching member 10 is disposed with an end face 11 facing the pressure chamber 12. In addition, a means connects the pressure chamber 12 to at least one pressure medium source. To this end, a duct 13 extends from the pressure chamber 12 to a pressure medium line 14 which, in turn, communicates with a pressure medium source in the form of a vapor producer 16, for example a steam generator. In addition, a pair of check valves 15 are disposed in the duct 13 in series to provide substantial restriction of any flow of pressure medium towards the chamber 12 and to inhibit any such flow towards the vapor producer 16.

In addition, a duct 17 branches off from the duct 13 between the pressure chamber 12 and the check valves 15 and extends to a piston chamber 6 of the servomotor arrangement. In addition, a pair of check valves 18 are disposed in series in the duct 17.

A second means is also provided for connecting the pressure chamber 12 to at least one pressure medium sink. To this end, an angle duct 19 branches off from the duct 17 between the check valves 15 and 18 and extends to a pressure medium sink, for example the atmosphere. As indicated, the duct 19 is recessed externally to form a valve seat 19' around which a tapped blind bore extends. In addition, a stop member 20 is disposed in this latter means in order to selectively block communication between the pressure medium sink and the pressure chamber 12. As shown, the stop member 20 is in the form of a solenoid valve which is threaded into the blind bore via a screw threaded connecting portion 21. The solenoid valve also includes a D.C. winding 22 and an axially movable part 23 forming a spindle 24, a collar 25 and an armature 26. As shown, a pressure spring 28 bears on the base of the tapped blind bore and acts on the collar 25 while the coil 22 is connected to a control signal line 29.

The servomotor arrangement 1 is used with a normally open valve 30 having a casing which extends around a valve chamber 33 and is integral with an inlet 31 for receiving a flow of medium, outlet 32 for expelling the flow of medium and the cylinder 3. The lower end of the piston 4 is secured to a piston rod 7 which extends through the piston chamber 6 and a wall 8 separating the chamber 6 from the valve chamber 33. In addition, the piston rod 7 is secured to a valve lid 40 within the chamber 33. This valve lid 40 has a peripheral sealing surface 42 which cooperates with a valve seat 44 in the valve chamber 33. On the side distal from the piston rod 7, the piston 4 has a peripheral back-seat seal 36 which cooperates sealingly with a corresponding surface on the cylinder head 35 so that when the piston 4 is in the top position,corresponding to the normal position, a piston chamber 9 is sealed off from the piston chamber 6. This piston chamber 9 communicates with the atmosphere by way of a duct 48 and an adjustable restrictor 49 in the form of a hollow screw.

As shown, a U-shaped duct 37 communicates the valve chamber 33 and piston chamber 6. In addition, an adjustable restrictor 38 in the form of a screw is disposed in the duct 37. In this respect, those portions of the duct 37 which are illustrated in the same plane actually extend in three dimensions so that the restrictor 38 is adjustable externally.

In addition, a U-shaped duct 50 branches off between the valve chamber 33 and the restrictor 38 to communicate the valve chamber 33 with a chamber 51 in the wall of the cylinder 3. By way of an angle duct 50′, 50″, the duct 48 communicates with the chamber 51. The chamber 51 also receives a small piston 52 which has a conical transition element and a cylindrical neck along with a bearing system 57. The piston 52 is movable in a cylindrical chamber 53 which is adjacent the chamber 51 and which communicates via a duct 54 with that portion of the duct 37 extending from the restrictor 38 to the piston chamber 6. Thus, there is a continuous unrestricted communication between the chambers 53 and 6.

As shown in FIG. 1, the piston 57 is guided in the duct 50″ which is of smaller diameter than the chamber 53 and which communicates via a duct 56 with the atmosphere. The conical transition portion of the piston 52 acts as a lid in cooperation with a seat formed on the edge between the duct 50″ and chamber 51.

The servomotor arrangement operates as follows:

In normal operation, the D.C. winding is energized via the control signal line 29. The armature 26 is therefore pulled on so that the spindle 24 presses against the valve seat 19′ to close the duct 19.

The lid 40 of the valve 30 is in a normal postion, i.e. the valve is opened, and pressure medium flows through the inlet 31 and valve chamber 33 into the outlet 32. Thus, the valve chamber 33 is pressurized.

The pressure in the piston chamber 6 is the same as the pressure in the valve chamber 33 since the chamber 33 communicates with the chamber 6 by way of the duct 37 and restrictor 38. In addition, the pressure in the piston chamber 6 is operative through the duct 54 in the chamber 53 and therefore on the piston 52. The same pressure is operative through the duct 50 in the chamber 51 and loads some of the conical transition portion of the piston 52. Consequently, on an imaginary circular surface of the same diameter as the duct 50″, the piston 52 experiences the upwardly acting pressure of the medium and the downwardly acting pressure of the atmosphere.

Because of the resulting pressure difference, the conical transition portion of the piston 52 sealingly engages on the seat between the duct 50″ and the chamber 51 to inhibit any flow of the pressure medium through the ducts 50, 50′. The chamber 9 is therefore at atmosphere pressure via the duct 48 and restrictor 49 and, because of the seal 36, is sealed off from the chamber 6. With the solenoid valve 20 closed, because of the check valves 15, 18, the duct 13 and pressure chamber 12 are at which ever is the higher of the pressures in the two pressure medium sources, i.e. the piston chamber 6 and the vapor producer 16. Consequently, the latching member 10 is pressed transversely against the extensions 5 of the piston 4 so that the piston 4 is latched or secured in the normal postion shown for as long as at least one of the two pressure medium sources is at high enough pressure. Even in the event of a decrease in the pressure of both pressure sources, the check valves 15, 18 help to keep the pressure up for a limited time and to keep the latching member 10 operative as long as the solenoid valve 20 stays closed.

When the D.C. winding 22 is denergized, the spring 28 moves the moving part 23 to the left so that the duct 19 opens and pressure medium flows from the chambers 6 and 12 to atmosphere. Since the restrictor 38 prevents the pressure medium from flowing from the valve chamber 33 into the piston chamber 6 at the same rate as the discharged pressure medium, the pressure in the chambers 6 and 53 decreases. However, since the chamber 51 still experiences the full pressure of the pressure medium flowing through the valve 30, the piston 52 descends with the conical transition part opening the valve cross-section so that pressure medium flows from the valve chamber 33 through the duct 50, chamber 51 and ducts 50″, 50′, 48 into the piston chamber 9.

Consequently, the pressure in the chamber 9 builds up substantially to the pressure in the valve chamber 33, since less pressure medium can discharge through the restrictor 49 than can enter through the duct 50′. Because of the pressure difference building up across the piston 4, the piston 4 descends until the lid 40 engages with the valve seat 44 and the valve 30 is in the closed state.

The path from chamber 12 to atmosphere by way of the ducts 13, 17, 19 is shorter and provides less restriction than the path from the chamber 6 to atmosphere via the duct 17, check valves 18 and duct 19. Also, the volume of the pressure chamber 12 is much less than the volume of the piston chamber 6. As previously stated, the check valves 15 have a considerable restricting effect. Consequently, when the solenoid valve 20 opens, the latching member 10 is relieved of load even before the piston chamber 6 and releases the moving system 2. Thus, not only is the effectiveness of the complete arrangement comprising the servo motor 1 and valve 30 ensured but also wear of the latching surfaces is avoided.

To re-open the valve 30, the winding 22 is energized so that the valve 20 closes. Thereafter, the events described take place but in the reverse order. An important factor is that the pressure in the chamber 6 increases very slowly because the volume of the chamber 6 increases continuously as the piston 4 rises. Thus, the build-up of pressure in the chamber 6 by the supply of pressure medium from the valve chamber 33 through theduct 37 is slowed down until the seal 36 abuts the surface co-operating with the seal 36. On the other hand, pressure medium must be ejected from the chamber 9 through the restrictor 49 to atompshere. Thus, the pressure in the chamber 9 decreases only slightly during the piston movement until abutment. Consequently, the pressure increase in the chamber 12 — from the piston chamber 6 via the duct 17, check valves 18 and duct 13 — occurs only very slowly, while the opposite pressure acting on the latching member 10, from the piston chamber 9, decreases only slightly as the piston 4 rises. In accordance with this behavior, the arrangement is so constructed that the latching member 10 engages only when the piston 4 is stationary, another feature which increases effectiveness and obviates wear.

The particular advantages of the described embodiment become particularly apparent when the valve 30 is required to remain open with the pressure medium at a very low pressure of possibly less than 1 bar as, for instance, is normal in steam turbine operation. In such a case, the pressure in the casing of the valve 30 drops. Because of the presence of the ducts 37, 50, 54, the pressure in the chambers 6, 53, 51 also drops. The piston 52 is moved by its own weight when the piston 52 can no longer be supported by the pressure in the chamber 53, the piston 52 then connecting the duct 50 to the ducts 50″, 50′, 48. The pressure in the chamber 9 then drops too — i.e., the same low pressure exists everywhere and neither the piston 4 nor the lid 40 experience any pressure differences. Thus, the moving system 2 tends to move into the closed position by its own weight. However, any such tendency must be prevented by the latching member 10 as follows:

The winding 22 is in the energized state by way of the line 29, and so the valve 20 remains closed. The check valves 18 prevent any drop of pressure in the ducts 17, 19, 13 between the chamber 12 and the valve 20 to the level of the pressure in the chamber 6. Thus, in this zone, the pressure is the pressure determined by the vapor producer 16. Consequently, the latching member 10 remains in the latching position, as is required for as long as the valve 20 remains energized. Consequently, the valve 30 is prevented from closing. As previously stated, even in the event of a malfunctioning of the vapor producer 16, the check valves 15, 18 ensure that the latching member 10 continues to latch for some time after the malfunctioning or failure.

If, departing from the example described with reference to FIG. 1, the latching member 10 is disposed in the pressure region of the piston chamber 6, the latching member 10 can be so devised in dependence upon the existing pressures as to engage in the chamber 6 only at low pressure, with a consequent reduction in wear.

In the case of the arrangement shown in FIG. 1, the latching member 10 can be so fitted that the safety of the servomotor arrangement remains substantially unaffected by external influences, for instance, such as destruction of the control line 29 or valve 20 or even the valve spindle 24 being torn away in connection with destruction of the valve 20. The servomotor, and therefore the valve 30, always move into the safety position.

The two pressure medium sources are shown in the example described with reference to FIG. 1; however, more than two such sources and/or a number of pressure medium sinks can be connected to the servomotor arrangement, selector circuit arrangements being provided so that the highest-pressure pressure medium source and the lowest-pressure pressure-medium sink operate.

Referring to FIG. 1, the latching member 10 may be such that even when the end face 11 experiences the maximum pressure of the pressure sources 6 and 16, the moving system constituted in part by the piston 4 may overcome the retaining force of the latching member 10 when a predetermined critical axial load acting on the moving system is exceeded. In this regard, the latching member 10 has a surface which frictionally engages with the piston extension 5 in the latching position.

Figures 2, 3, 4, 5, 6, 7:
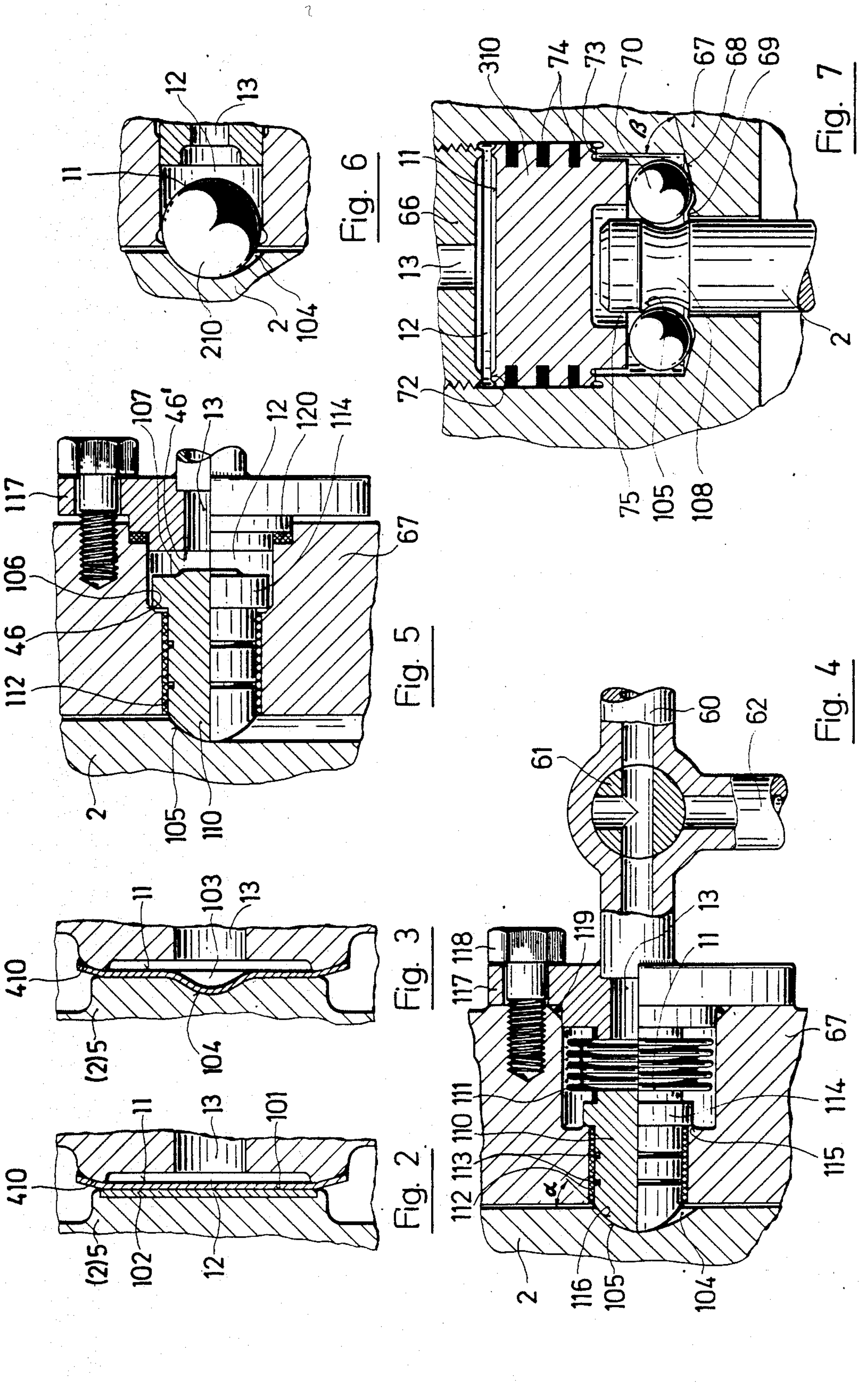
FIG. 2 illustrates a part cross-sectional view of a diaphragm type latching member positioned in accordance with the invention.
FIG. 3 illustrates a view similar to FIG. 2 of a modified diaphragm type latching member in accordance with the invention.
FIG. 4 illustrates a cross-sectional view of a plunger type latching member in conjunction with a corrugated tube in accordance with the invention.
FIG. 5 illustrates a cross-sectional view of a further plunger type latching member in accordance with the invention.
FIG. 6 illustrates a part cross-sectional view of a latching member in the form of a spherical plunger in accordance with the invention.
FIG. 7 illustrates a part cross-sectional view of a servomotor arrangement employing intermediate elements in accordance with the invention.

Referring to FIG. 2, wherein like reference characters indicate like parts as above, the latching member is in the form of a diaphragm 410 which has a side extending in parallel to a braking member 102 on the piston extension 5 and which has a braking surface 101 facing the diaphragm 410. As indicated, the diaphragm 410 is mounted on a stationary part of the servomotor arrangement while the braking member 102 is mounted on the piston extension 5. When the diaphragm 410 is not in the latching position, a narrow gap exists between the diaphragm 410 and braking surface 101. The diaphragm 410 is made of a flexible material such as spring seal plate and is sealingly welded without impairment of flexability and associated mobility to the stationary head 35 of the servomotor arrangement. The surface 101 of the braking member 102 is in the form of a silver-plated or nickel-plated austenitic steel plate having a higher coefficient of friction than the diaphragm 410. As above, a pressure medium flows through a duct 13 into the pressure chamber 12.

In operation, the diaphragm 410 is acted upon by the pressure medium in the chamber 12 and deforms. Consequently, the diaphragm 410 is pressed onto the braking surface 101 and retains or latches the moving system 2 by friction. When the communication with the pressure medium source is interrupted and changed over to a pressure medium sink, for instance, by the operation of a three-way valve (not shown) the pressure in the chamber 12 decreases and the stressing of the diaphragm 410 decreases. The diaphgram 410 then returns under a natural resilience to the original shape parallel to the braking surface 101 and thus releases the moving system 2.

A single diaphragm or a number of disphragms 410 can be arranged around the piston extension 5. Another possibility is to use a single cylindrical diaphragm which extends around the extension 5 and which, when in the latching position, applies a uniform load around the whole periphery of the extension 5.

Referring to FIG. 3, wherein like reference characters indicate like parts as above, the diaphragm 410 may be provided with a bulge 103 which engages in a matching recess 104 in the extension 5 when in the latching position. The engagement of the bulge 103 in the recess 104 produces forces which enhance the frictional effect so that less pressure is necessary than in the FIG. 2 embodiment in order to latch the moving system 2 with a latching member of given dimensions.

Referring to FIG. 4, the latching member may be in the form of a plunger 110 which is secured on an end face 11 to a corrugated tube 111 so as to be guided coaxially in a bore in a stationary part 67 of the servomotor arrangement 1. In addition, the corrugated tube 111 defines a pressure chamber.

In order to prevent the plunger 110 from jamming, a liner 112 is provided to facilitate sliding of the plunger while pressure is equalized around the periphery by means of a number of annular grooves 113 in the plunger 110. In addition, a collar 114 on the plunger 110 limits the stroke of the plunger 110 by abutting an annular seat 115 in the stationary part 67.

As shown, the moving system 2 is provided with a recess 104 which is sized to have shoulder 105 for engaging with the plunger 110 when the plunger is in the latching position and abuts by way of a surface 116.

In addition, a cover 117 is secured to the stationary part 67 by screws 118 with seal tightness being provided by an 0-ring 119 as shown. The corrugated tube 111 connects one end of the plunger 110 to the cover 117 in sealed relation and communicates via the duct 13 with a three way valve 61 which serves as a stop member. One inlet 60 of the valve 61 communicates with a pressure medium source (not shown) while an outlet 62 communicates with a pressure medium sink (not shown).

The plunger 110 is shown in a latching or retaining position in FIG. 4 while the valve 61 is shown in a position for communication between the pressure chamber 12 within the corrugated tube 111 and the pressure medium source (not shown). In this position, the collar 114 is pressed onto the seat 115. When the valve 61 is turned 90° counterclockwise, communication with the pressure medium source is interrupted and established with the pressure medium sink via the outlet 62. The pressure in the pressure chamber 12 therefore decreases and the force acting on the plunger 110 decreases. This latter force corresponds to the product of the pressure in the chamber 12 within the tube 111 times the size of the end face 11. The force tending to urge the plunger 110 away from the recess 104 now predominates so that the plunger 110 moves towards the chamber 12 and, in so doing, compresses the corrugated tube 111 and releases the moving system 2.

The dimensioning of the plunger 110 must take into account the pressure differences, the friction on the rubbing surfaces and the force which the moving system 2 exerts on the surface 116. The force component which acts on the plunger 110 and which influences the movement of the plunger 110 depends upon the angle $\alpha$ between the direction of movement of the system 2 and the surface 116.

Referring to FIG. 5, wherein like references characters indicate like parts as above, a plunger like latching member 110 can be provided with two sealing surfaces 106, 107 on the collar 114 to cooperate with respective seats 46, 46' on the stationary part 67 of the servomotor arrangement.

With the plunger 110 in the latching or retaining position, the sealing surface 106 is in engagement with the seat 46, thus preventing any flow of pressure medium, which might be damaging between the plunger 110 and the liner 112. However, when the plunger 110 is in the position in which the moving system 2 is free and if a pressure difference then acts on the plunger 110 to urge the plunger 110 towards the chamber 12, the sealing surface 107 is pressed onto the seat 46' and no external medium can enter the duct 13. The operative surfaces of the plunger 110 must be dimensioned to suit the existing pressures.

For the rest, the plunger of FIG. 5 operates just like the plunger of FIG. 4 and the plungers of the two embodiments differ only in two constructional details — the shoulder 105 of FIG. 5 is not part of a recess but extends as an annular shoulder around the moving system, and the seal between the cover 117 and the stationary part is a captive seal 120.

Referring to FIG. 6, wherein like reference characters indicate like parts as above, the latching member may be in the form of a spherical ball 210 which is received in the latching position in a recess 104 in the moving system 2. This is a particularly simple and inexpensive embodiment.

Referring to FIG. 7, wherein like reference characters indicate like parts as above, the servomotor arrangement may be constructed with a moving system 2 which is disposed coaxially of a pressure chamber 12. In this embodiment, a plurality of intermediate elements in the form of spherical balls 70 are disposed to cooperate with an annular recess 108 in an extension of the piston of the moving system 2. As indicated, the spherical elements 70 are mounted for transverse movement relative to the system 2 between the latching position, as shown, to latch the system and a release position (not shown) to unlatch the system. In addition, a plunger 310 communicates with the pressure chamber 12 for moving axially of the piston of the moving system 2 between a first position holding the spherical elements 70 in a latching position, as shown, and a second position (not shown) to permit the spherical elements 70 to move away from the latching position into a release position.

In this embodiment, the plunger 310 is movable in a direction parallel to the direction of movement of the moving system 2 and has two seats 72, 73 which cooperate with matching surfaces on a stationary part 67 of the servomotor arrangement to limit plunger movement. The seat 72 is disposed on an end face 11 of the plunger 310 which faces the pressure chamber 12 while the seat 73 is disposed on an opposite end face. In addition, a plurality of piston rings 74 are provided in the cylindrical guide surface of the plunger 310 to provide seal tightness as is known.

The spherical elements 70 are arranged in a ring between the bottom end face of the plunger 310 and the moving system 2. In addition,the spherical elements 70 are rollingly mounted on a bearing surface 68 of the stationary part 67 which is inclined transversely of the direction of movement of the moving system 2. As indicated, the bearing surface 68 is disposed at an angle $\beta$ relative to the direction of movement of the piston of the moving system 2. The value of this angle $\beta$ depends upon the pressure of the pressure medium and upon the position of an engagement zone 75 between the piston of the moving system 2 and the spherical elements 70 in the fully engaged state.

As shown, the bearing surface 68 has an edge 69 which extends around the moving system 2 and which prevents the spherical elements 70 from dropping out when the system 2 is extended.

As with the embodiment of FIG. 4, the embodiment of FIG. 7 also has a stop member, a pressure medium source and a pressure medium sink (not shown) as above described. In addition, a sealing element (not shown) is disposed between the cover 66 and the stationary part 67.

As indicated, the shoulder 105 in the annular groove 108 of the moving system 2 biases the spherical element 70 in a direction from the pressure chamber 12 so that the elements 70 receive the load in the zone 75 and transmits some of the load to the surface 68. The bearing surface 68 thus divides the force acting thereon into two components, i.e. a component which is perpendicular to the surface 68 and which is responsible for a friction force and a component which is parallel to the surface 68 and which, acting opposite to the friction force, tends to disengage the element 70 from the moving system 2. In the latching position, the spherical elements 70 are prevented from moving by the plunger 310 since the plunger 310 is retained by the pressure medium operative in the chamber 12. In this position, the plunger 310 engages sealingly by way of the seat 73 on the associated matching surface so that there is no escape of pressure medium. As in the embodiment of FIG. 4, latching is released by a stop member (not shown) being operated to connect the pressure chamber 12 to a pressure medium sink. This permits the pressure on the plunger 310 to decrease so that the plunger 310 is forced upwardly by the spherical elements 70. When the pressure near the spherical element 70 exceeds the pressure in the chamber 12, the seat 72 and the matching surface prevent any discharge of pressure medium through the chamber 12 into the bore 13.

In the embodiment of FIG. 7, the spherical elements, i.e. balls 70, are shown as intermediate members. However, elements of a different shape can be used which, when the force is applied to them at a particular place, slide out in a predictable direction, as, for example, in the case of free-wheeling. Bent levers could also be used.

In the embodiments where a plunger type latching members are used, the contact between the plunger and shoulder can be a point or linear or surface contact depending upon the nature of the contact surfaces. Further, the amount of surface pressure in the zone can vary widely to suit existing pressures, materials and coefficients of friction.

In all embodiments using a plunger, the restoring force for moving the plunger from the latching position is provided by the moving system 2 itself, the same acting via the shoulder 105 on the inclined surface 116 or on the surface 68. However, the plunger can be moved back for example by means of at least one steel spring.

Another possibility is for the plunger to be arranged, if it seems convenient, to move not perpendicularly but at an inclination to the direction of movement of the moving system 2.

The various embodiments of the invention are so compact, and their actuating systems are so simple, that a number of latching members can be provided and they can engage simultaneously or independently of one another. In the case of simultaneous actuation, an additional safety feature is provided by redundancy, the forces are distributed more satisfactorily and surface pressure is reduced. In the latter case, repairs and inspections can be carried out without impairing system safety, since some of the latching members can always remain in operation.

Another possibility is for the moving system to be latchable in at least one intermediate position as well as in its end positions. This feature can be provided by a shoulder plane and by a number of latching members 10 disposed opposite various positions taken up by the system 2 during its movement or by a number of shoulder planes opposite a single plane of the arrangement at least one latching member being provided in the latter plane.

It will be apparent from the foregoing, more particularly from the description of the example illustrated in FIG. 1, that the use of the latching or retaining members according to the invention extends the controllability and, therefore, the operating safety of pressure-medium-operated servomotor arrangements to pressure ranges far removed from the operative range of conventional servomotor arrangements.

What is claimed is:

1. In combination, a normally open valve having a valve chamber for receiving a pressurized flow of medium, an outlet for expelling the flow of medium from said chamber and a valve lid for closing said outlet; and a servomotor arrangement for controlling movement of said valve lid, said arrangement including a cylinder;

a piston movably mounted in said cylinder to divide said cylinder into two piston chambers and connected to said valve lid;

a duct communicating said valve chamber with one of said piston chambers to pressurize said one chamber;

a pressure chamber;

at least one latching member disposed across said pressure chamber for movement transversely of the direction of movement of said piston between a latching position and a release position, said latching member having a surface for frictionally engaging said piston to latch said piston in said latching position and to unlatch said piston in said release position;

first means connecting said pressure chamber to at least one pressure medium source for receiving a pressurized medium to retain said latching member in said latching position;

second means for selectively connecting said pressure chamber to at least one pressure medium sink with said latching member in said release position; and a stop member in at least one of said means to selectively block communication between said one means and said pressure chamber.

2. The combination as set forth in claim 1 wherein said latching member is a diaphram and which further comprises a braking member having a braking surface for facing said diaphragm in said latching position, and a stationary part mounting one of said diaphragm and said braking member thereon with said piston having the other of said diaphragm and said braking member thereon.

3. The combination as set forth in claim 1 wherein said latching member is a plunger.

4. The combination as set forth in claim 3 which further comprises a casing housing said piston and a corrugated tube connecting one end of said plunger to said casing and defining said pressure chamber.

5. The combination as set forth in claim 3 which further comprises a casing housing said piston and wherein said plunger is sealingly seated in said casing in at least one of said latching position and said release position.

6. The combination as set forth in claim 1 which further comprises at least one check valve in said first means for preventing a pressure drop in said pressure chamber with said stop member in a position corresponding to said latching member being in said latching position.

7. The combination as set forth in claim 1 which further comprises a check valve in said first means to restrict flow of pressure medium to said pressure chamber and to inhibit flow towards said pressure medium source.

8. The combination as set forth in claim 7 which further comprises a second duct communicating said one piston chamber with said pressure chamber and a check valve in said second duct to inhibit flow towards said one piston chamber.

9. The combination a normally open valve having a valve chamber for receiving a pressurized flow of medium, an outlet for expelling the flow of medium from said chamber and a valve lid for closing said outlet; and a servomotor arrangement for controlling movement of said valve lid, said arrangement including a cylinder;

a piston movably mounted in said cylinder to divide said cylinder into two piston chambers and connected to said valve lid;

a duct communicating said valve chamber with one of said piston chambers to pressurize said one chamber;

a pressure chamber;

at least one latching member mounted for transverse movement relative to said piston between a latching position to latch said piston and release position to unlatch said piston;

a plunger communicating with said pressure chamber for moving axially of said piston between a first position holding said latching member in said latching position and a second position permitting said latching member to move from said latching position into said release position;

first means for connecting said pressure chamber to at least one pressure medium source;

second means for connecting said pressure chamber to at least one pressure medium sink; and a stop member in at least one of said means to selectively block communicating between said one means and said pressure chamber.

10. The combination as set forth in claim 9 which further comprises a bearing surface disposed at an angle relative to the direction of movement of said piston and said member is a rolling member rollingly mounted on said bearing surface for movement between said latching position and said release position.

* * * * *

UNITED STATES PATENT AND TRADEMARK OFFICE
CERTIFICATE OF CORRECTION

PATENT NO. : 4,700,925

DATED : October 20, 1987

INVENTOR(S) : Steffen P. Russak

It is certified that error appears in the above-identified patent and that said Letters Patent is hereby corrected as shown below:

Column 1, line 5 "realtes" should be -relates-
Column 2, line 13 "loss, of" should be -loss of-
Column 7, line 3 "atompshere" should be -atmosphere-
Column 10, line 61 "transmits" should be -transmit-
Column 11, line 23 delete "a"

Signed and Sealed this

Seventh Day of June, 1988

*Attest:*

DONALD J. QUIGG

*Attesting Officer*

*Commissioner of Patents and Trademarks*